United States Patent
Bidan et al.

(10) Patent No.: US 12,467,413 B2
(45) Date of Patent: Nov. 11, 2025

(54) METHOD FOR REGULATING A TURBOMACHINE

(71) Applicant: SAFRAN, Paris (FR)

(72) Inventors: Guillaume François Daniel Bidan, Moissy-Cramayel (FR); Antoine Pierre Emmanuel Ferrand, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/577,641

(22) PCT Filed: Jul. 5, 2022

(86) PCT No.: PCT/FR2022/051336
§ 371 (c)(1),
(2) Date: Jan. 8, 2024

(87) PCT Pub. No.: WO2023/281202
PCT Pub. Date: Jan. 12, 2023

(65) Prior Publication Data
US 2024/0318604 A1    Sep. 26, 2024

(30) Foreign Application Priority Data
Jul. 9, 2021   (FR) ...................................... 2107474

(51) Int. Cl.
*F02C 7/36* (2006.01)
*B64D 27/33* (2024.01)
(Continued)

(52) U.S. Cl.
CPC ................ *F02C 7/36* (2013.01); *F01D 15/10* (2013.01); *F01D 21/14* (2013.01); *F05D 2270/023* (2013.01); *F05D 2270/044* (2013.01)

(58) Field of Classification Search
CPC . F01D 15/10; F01D 21/14; F02C 7/36; B64D 35/08
See application file for complete search history.

(56) References Cited

U.S. PATENT DOCUMENTS

2018/0354631 A1* 12/2018 Adibhatla .............. B64D 27/24
2020/0055610 A1* 2/2020 Terwilliger .......... H02J 7/1415

FOREIGN PATENT DOCUMENTS

| EP | 3751115 A1 | 12/2020 |
| FR | 3056558 A1 | 3/2018 |
| WO | WO 2016020618 A1 | 2/2016 |

OTHER PUBLICATIONS

International Patent Application PCT/FR2022/051336 International Search Report dated Oct. 17, 2022 with English translation, 6 pages.

* cited by examiner

*Primary Examiner* — Deming Wan
(74) *Attorney, Agent, or Firm* — Cozen O'Connor (57) ABSTRACT

A turbomachine may include a high-pressure turbine connected to a high-pressure shaft and a low-pressure turbine connected to a low-pressure shaft, the hot gases leaving the high-pressure turbine driving the low-pressure turbine. A method for regulating the turbomachine includes electrically assisting the high-pressure shaft in order to provide said high-pressure shaft with electrical energy in addition to thermal energy obtained from a combustion chamber of the turbomachine, for an assistance period, and correcting the speed of the low-pressure shaft to achieve a reference speed of the low-pressure shaft that was previously determined in the absence of electrical assistance.

13 Claims, 5 Drawing Sheets

(51) Int. Cl.
*B64D 27/35* (2024.01)
*B64D 35/08* (2025.01)
*F01D 15/10* (2006.01)
*F01D 21/14* (2006.01)

METHOD FOR REGULATING A TURBOMACHINE

CROSS-REFERENCE TO RELATED APPLICATIONS

This application is a US National phase Application of PCT/FR2022/051336 filed Jul. 5, 2022, which claims priority to French Patent Application No. 2107474 filed Jul. 9, 2021, both of which are hereby incorporated in their entirety.

TECHNICAL FIELD OF THE INVENTION

This invention relates to a turbomachine for an aircraft, in particular to the regulation of a turbomachine using electrical assistance.

PRIOR ART

Figure 1:
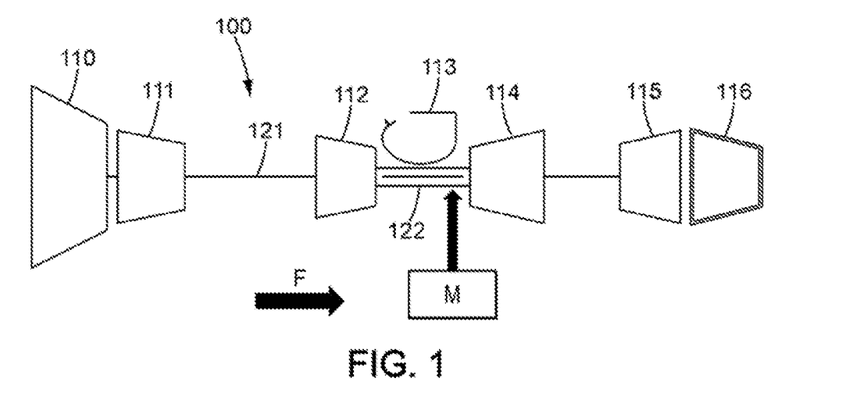
FIG. 1 schematically represents a turbomachine according to the prior art.

A turbomachine 100 is known that is similar to the one described in document FR 3087491, as schematically represented in FIG. 1, which is of the dual-flow double-body turbojet type for an aircraft. Turbomachine 100 comprises, from upstream to downstream in the direction of the gas flow F, a fan 110, a low-pressure compressor 111, a high-pressure compressor 112, a combustion chamber 113 which receives a fuel flow setpoint, a high-pressure turbine 114, a low-pressure turbine 115, and a primary exhaust nozzle 116. Low-pressure (or LP) compressor 111 and low-pressure turbine 115 are connected by a low-pressure shaft 121 and together form a low-pressure body. High-pressure (or HP) compressor 112 and high-pressure turbine 114 are connected by a high-pressure shaft 122 and together form, with the combustion chamber, a high-pressure body generating hot gases. Fan 110, which is driven by LP shaft 121, compresses the air taken in. This air is divided downstream of fan 110, into a secondary air flow which is directed directly towards a secondary nozzle (not shown) through which it is ejected to contribute to the thrust provided by turbomachine 100, and the "primary" flow which enters the gas generator, composed of the low-pressure body and the high-pressure body, then is ejected into primary nozzle 116.

LP shaft 121 and HP shaft 122 generally do not rotate at the same speed and they do not have the same inertia. As a result, particularly in the acceleration phases, LP compressor 111 accelerates more slowly (referred to as speed N1) than HP compressor 112 (referred to as speed N2), due in part to their different inertias. A situation is then obtained where LP compressor 111 compresses more air than HP compressor 112 can receive. This situation creates a risk of surge within the zone of LP compressor 111. This phenomenon corresponds to significant and rapid fluctuations in the pressure downstream of the compressor concerned. Once it begins, surge can result in extinguishing the combustion chamber. It also generates significant jolts to the compressor blades and can thus lead to mechanical damage.

The design of turbomachine 100 requires incorporating a sufficient margin for the surge phenomenon. The operation of a compressor during use is generally represented by a diagram which expresses the pressure ratio obtained between the outlet and the inlet, as a function of the air flow passing through it; this diagram is also parameterized according to the rotation speed of the compressor. A surge line appears in the diagram, which constitutes the maximum limit for the compression ratio which is not to be exceeded, so as to avoid the appearance of a surge phenomenon. In a known manner, what is referred to as a working line is defined, associating the compression ratios obtained as a function of the fuel flow, when turbomachine 100 is in stabilized operation. The positioning of this working line is left to the discretion of the designer of turbomachine 100, and the distance from this working line to the surge line represents the surge margin. It should be noted that the efficiency of the high-pressure compressor (compression work supplied to the air, compared to the work expended to drive its rotation) is, as a first approximation, better as we approach the surge line.

Conversely, accelerations requested by the pilot when starting from a stabilized operation (transient phase) in order to obtain an increase in thrust, translate at the compressor into a deviation of the operating point which occurs in the direction of the surge line.

Current solutions for controlling the turbomachine involve a plurality of logic principles for fuel flow regulation. During stabilized phases, the fuel flow to be supplied to the turbomachine is calculated as a function of the difference in speed N1 of LP shaft 121 between a control setpoint and the current speed. During transient phases, a regulation loop at speed N2 of HP shaft 122 is activated in order to control acceleration and the deviation of the operating point within the field of HP compressor 112. The regulation loop generates an acceleration path based on a time derivative profile of speed N2 of HP shaft 122 as a function of the current speed, which makes it possible to accelerate the turbomachine safely. However, in severe environmental conditions encountered by turbomachine 100 such as a hot region, a high altitude, or highly-demanding mechanical conditions, an operability limit which maintains a safety margin relative to the surge line may be reached. This leads to limiting the flow of fuel that can be injected during acceleration and therefore leads to degraded acceleration performance. There is therefore the risk that the initially planned path for speed N2 of HP shaft 122 is prevented from being implemented. To avoid this situation, one solution consists of using a hybridization of HP shaft 122 by providing torque produced by an electric motor to regain the acceleration performance of HP shaft 122 at speed N2 while limiting the fuel flow rate. However, providing mechanical torque via an electric motor leads to a power deficit in the hot gases generated by the HP turbine and the combustion chamber and which are injected into the LP turbine. This results in a delay in the acceleration of LP shaft 121 at speed N1 in cases where electrical assistance to HP shaft 122 is used, in comparison to a nominal acceleration achieved using fuel only.

There is therefore a need to provide means of regulation to compensate for or to limit the acceleration delay of LP shaft 121 when providing mechanical torque via an electric motor.

SUMMARY OF THE INVENTION

To this end, the present document proposes a method for regulating a turbomachine comprising a high-pressure turbine connected to a high-pressure shaft and a low-pressure turbine connected to a low-pressure shaft, the hot gases exiting the high-pressure turbine driving the low-pressure turbine, the method comprising:
  a—electrically assisting the high-pressure shaft by means of an electric machine, in order to provide said high-pressure shaft with mechanical energy coming from the electrical energy supplied to the electric machine to supplement thermal energy coming from a combustion chamber of the turbomachine, for an assistance period, and b—correcting the speed of the low-pressure shaft in order to reach a reference speed of the low-pressure shaft that was previously determined in the absence of electrical assistance.

The method makes it possible to limit the loss in acceleration of the low-pressure shaft during the phases of electrically assisting the high-pressure shaft. The method thus allows compensating for the loss of acceleration undergone during the electrical assistance phase so that, in the end, the acceleration time of the LP shaft is the same as for non-hybrid acceleration or without electrical assistance.

The speed of the low-pressure shaft, respectively the speed of the high-pressure shaft, may be a reduced speed of the low-pressure shaft, respectively the speed of the high-pressure shaft.

The reference speed of the LP shaft may be determined beforehand for a plurality of operating instants of the turbomachine, in the absence of any electrical assistance to the HP shaft.

The reference speed of the LP shaft may be determined beforehand for a plurality of operating speeds of the HP shaft, in the absence of any electrical assistance to the HP shaft. The reference speed of the low-pressure shaft may be determined experimentally or by simulation.

The turbomachine may comprise a fan positioned upstream of a hot gas generator and defining a primary flow and a secondary flow. The hot gas generator is traversed by the primary flow and comprises a high-pressure compressor, a combustion chamber, and a high-pressure turbine.

The turbomachine may comprise an electric motor which makes it possible to provide assisting torque to the high-pressure shaft during the electrical assistance phases. The method may comprise the steps of:

b1—determining an energy deficit at the outlet of the high-pressure turbine, as a function of the difference between the power of the generated hot gases and the reference power of the hot gases in the absence of electrical assistance, during the assistance period, b2—calculating a mechanical torque to be collected at the high-pressure shaft by means of the electric machine, as a function of said energy deficit, b3—collecting said mechanical torque to be collected, from the high-pressure shaft, by means of the electric machine, at the end of the assistance period.

The electric machine can be controlled to collect the mechanical torque calculated in step b2 to brake the high-pressure shaft. This has the effect of increasing the fuel flow to be supplied to the combustion chamber of the turbomachine in order to maintain the speed of the high-pressure shaft at a set speed level, in particular to comply with an acceleration path of the high-pressure shaft.

The reference power of the hot gases can be determined beforehand for a plurality of operating instants of the turbomachine, in the absence of any electrical assistance to the high-pressure shaft. This determination can be carried out experimentally or by simulation. Step b3 can be carried out until the power of the hot gases at a given speed of the high-pressure shaft is greater than or equal to the reference power of the hot gases for the same given speed of the high-pressure shaft.

Step b1 may comprise the sub-steps of:

for each instant of the assistance period, calculating a difference between the power of the generated hot gases, and the reference power of the hot gases in the absence of electrical assistance, calculating the energy deficit by integrating the calculated differences over the assistance period.

Two successive instants may be separated by a predetermined duration which may be the duration of a control loop of the turbomachine.

Step b2 may comprise the following sub-steps:

providing a target instant for reaching the reference speed of the low-pressure shaft, calculating a mean power as a function of the energy deficit and the target instant, calculating the mechanical torque to be collected by means of the electric machine as a function of the mean power, in order to supply said mean power to the low-pressure shaft.

The mean power can be calculated according to the following formula:

$$P_{core_{sup_{mean}}} = \frac{E_d}{t_{tar} - t_{assist}} \qquad \text{[math 1]}$$

where $$P_{core_{sup_{mean}}}$$

is the mean power, $E_d$ is the energy deficit, $t_{tar}$ is the target instant, and $t_{assist}$ is the duration of the electrical assistance period.

The mechanical torque to be collected by the electric machine can be calculated as a function of the mean power, using a pre-established law.

The power of the generated hot gases can be determined as a function of the speed of the high-pressure shaft and of the mechanical assistance torque generated by means of the electric machine. For example, the power of the hot gases can be determined by consulting a previously established database containing values for the power of the hot gases in relation to speed values for the high-pressure shaft and values for the mechanical assistance torque supplied by means of the electric machine.

The reference power of the hot gases can be previously determined as a function of the speed of the high-pressure shaft when the mechanical assistance torque generated by means of the electric machine is zero. For example, the reference power of the hot gases can be determined by consulting a previously established database comprising values for the reference power of the hot gases as a function of the speed values for the high-pressure shaft.

The method may comprise the operations of:

b1'—determining a correction coefficient as a function of the mechanical assistance torque generated by means of the electric machine, and b2'—regulating the speed of the high-pressure shaft as a function of the correction coefficient.

The correction coefficient can be determined as a function of the speed of the high-pressure shaft at an operating instant of the turbomachine, and a corrected speed of the high-pressure shaft.

The corrected speed of the high-pressure shaft can be determined according to the following operations:

measuring the speed of the high-pressure shaft at said operating instant, in particular during the electrical assistance phase, determining the reference power of the hot gases which corresponds to the speed of the high-pressure shaft for said operating instant in the absence of electrical assistance, and determining the corrected speed of the high-pressure shaft as a function of the reference power of the hot gases and of the mechanical assistance torque generated by means of the electric machine at said operating instant.

Thus, the corrected speed of the high-pressure shaft can be configured to produce, at each operating instant, a power of the hot gases during electrical assistance that is equivalent to a power of the hot gases for the same speed of the high-pressure shaft in the absence of electrical assistance.

The correction coefficient can be the ratio between the corrected speed of the high-pressure shaft and the reference speed of the high-pressure shaft in the absence of electrical assistance.

Operation b2' may comprise the following sub-operations:

providing an acceleration path for the high-pressure shaft, applying the correction coefficient to the acceleration path of the high-pressure shaft, controlling the speed of the high-pressure shaft to follow the path of the corrected acceleration path of the high-pressure shaft.

The speed of the high-pressure shaft, respectively the speed of the low-pressure shaft, may be determined by a rotational speed or an acceleration of the high-pressure shaft, respectively of the low-pressure shaft.

The turbomachine may be an aircraft turbomachine.

This document also concerns a computer program comprising instructions for executing the above when said program is executed by a processor.

This document also concerns a device comprising means configured to implement the method as mentioned above.

This document also relates to a device comprising means configured to correct the speed of the low-pressure shaft which are configured to implement the above method.

DETAILED DESCRIPTION OF THE INVENTION

Figure 2A:
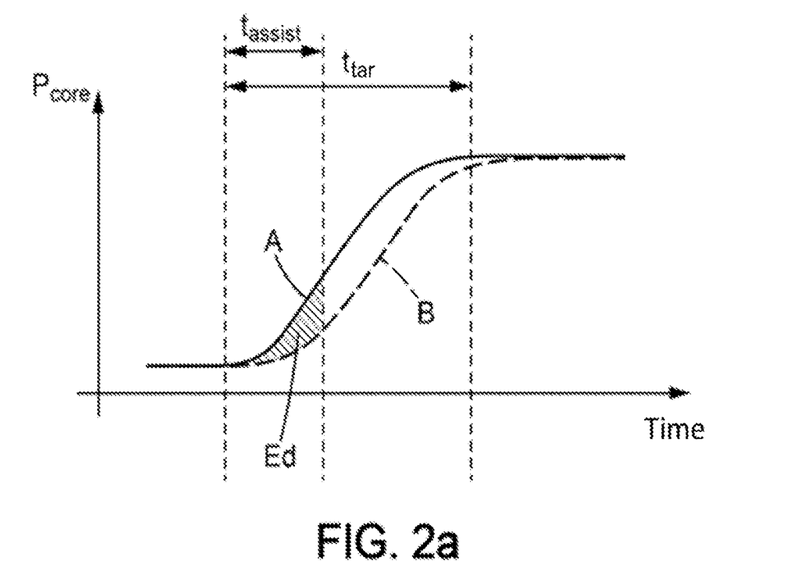
FIG. 2a represents comparative curves for the power of the generated gases exiting the high-pressure turbine of the turbomachine of FIG. 1 with and without electrical assistance.
Figure 2B:
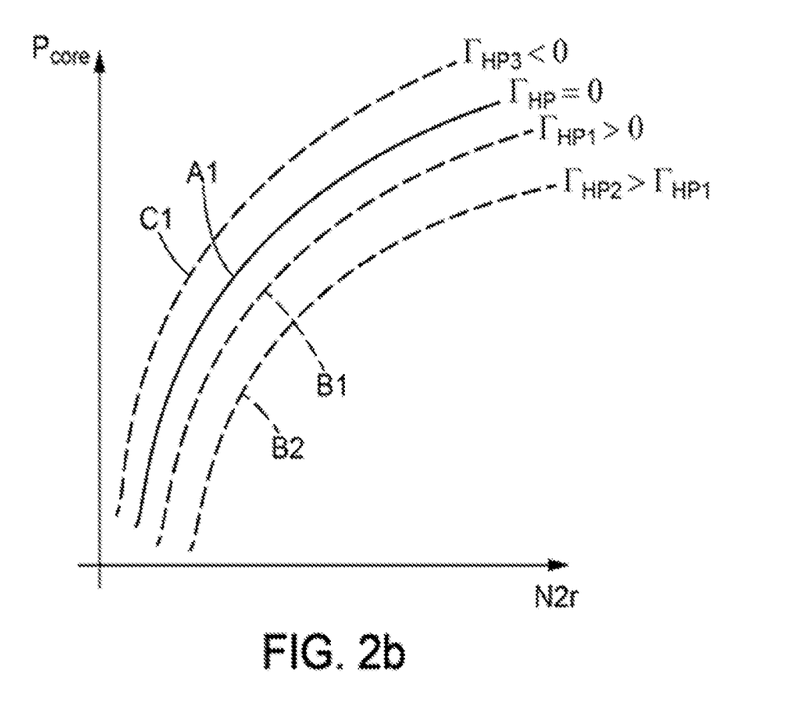
FIG. 2b represents the variations in power of the generated gases as a function of the speed of the high-pressure shaft and of the level of electrical assistance.

With reference to FIGS. 1 and 2, curve A shows the power of the generated gases $P_{core}$ exiting high-pressure turbine 114 of turbomachine 100 in the absence of electrical assistance (non-hybridized), and curve B shows the power of the generated gases $P_{core}$ exiting high-pressure turbine 114 in the hybridized case when mechanical assistance torque generated by means of the electric machine is supplied to high-pressure shaft 122 (also called HP shaft), for an assistance period $t_{assist}$. The power of the generated gases $P_{core}$ in the presence of electrical assistance is lower than the power of the reference gases $P_{core}$ exiting high-pressure shaft 122.

Indeed, when an operability limit that protects against the surge phenomenon is reached, the fuel flow becomes limited and then deviates from its set value, resulting in a deficit in the acceleration of high-pressure shaft 122 which then deviates from the set acceleration path dN2/dt for HP shaft 122. When regulated in order to follow the acceleration path dN2/dt, the contribution of mechanical torque generated by means of the electric machine during electrical assistance makes it possible to compensate for the acceleration deficit and therefore to be able to follow the acceleration path dN2/dt. However, as the fuel flow is saturated in this assistance phase, the thermal power (or the power of the generated hot gases) at the outlet of HP turbine 114 is then lower than the thermal power of HP turbine 122 without assistance, therefore resulting in an acceleration deficit of LP shaft 121 in comparison to non-hybridized acceleration.

As can be seen in FIG. 2b, curve A1 also shows the power of the generated gases $P_{core}$ of turbomachine 100 in the non-hybridized case, as a function of speed N2r of HP shaft 122. Curves B1 and B2 show the power of the generated gases $P_{core}$ in the hybridized case, when the mechanical assistance torque generated by means of the electric machine, respectively $\Gamma_{HP1}$ and $\Gamma_{HP2}$, is supplied to high-pressure shaft 122. Mechanical assistance torque generated by means of the electric machine $\Gamma_{HP1}$ is less than mechanical assistance torque generated by means of the electric machine $\Gamma_{HP2}$. The power of the generated gases $P_{core}$ decreases with the increase in supplied mechanical assistance torque generated by means of the electric machine.

Thus, for the same speed dN2r of HP shaft 122, the power of the hot gases varies as a function of the mechanical assistance torque generated by means of the electric machine that is supplied to HP shaft 122.

Figure 3:
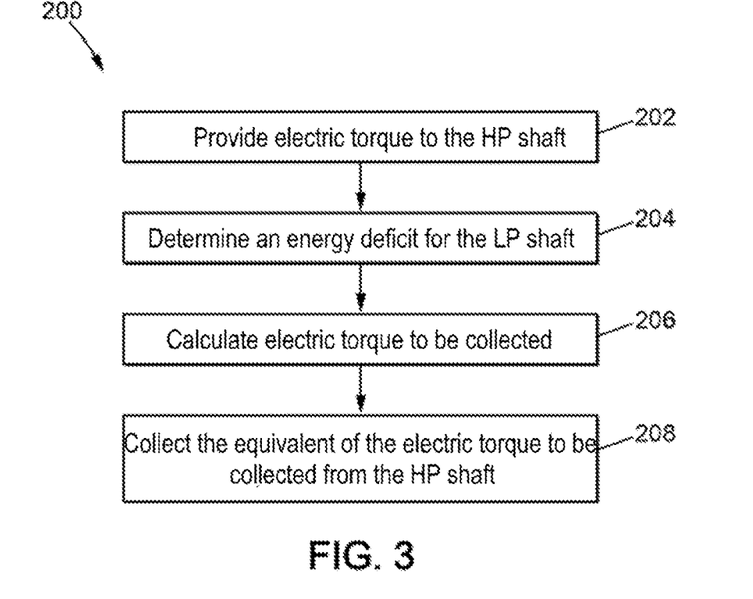
FIG. 3 schematically represents a first example of a method for regulating the turbomachine of FIG. 1.
Figure 4:
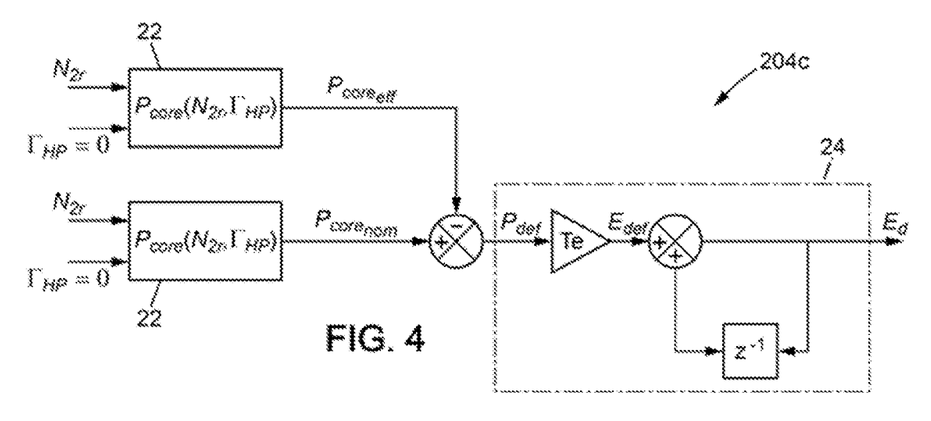
FIG. 4 represents a block diagram for calculating the energy deficit of step 202 in the first example of the method of FIG. 3.
Figure 5:
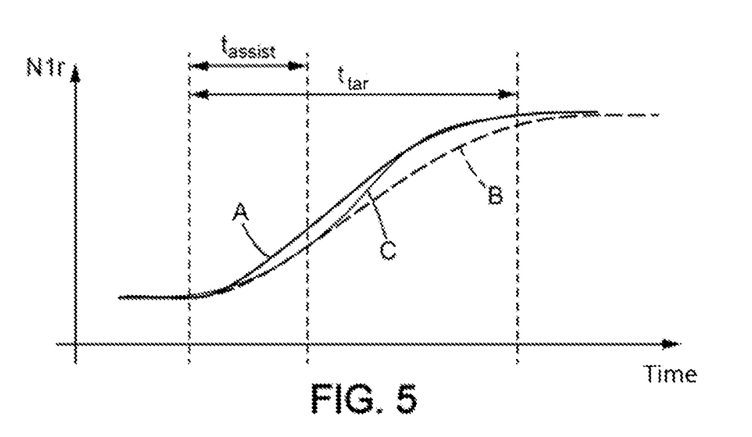
FIG. 5 represents the comparative curves of FIG. 2 in addition to a curve of the speed of the low-pressure shaft which is corrected using the method of FIG. 3.

With reference to FIGS. 3 to 5, a first example of a method 200 for regulating turbomachine 100 is configured to compensate for the reduction in speed N1r in the presence of electrical assistance. Method 200 comprises a first step 202 of electrical assistance by providing mechanical assistance torque generated by means of the electric machine $\Gamma_{HP}$, to HP shaft 122. For example, turbomachine 100 may comprise an electric motor M forming a device which allows providing mechanical assistance torque $\Gamma_{HP}$ to high-pressure shaft 122 during the electrical assistance phases $t_{assist}$. The duration of the assistance period $t_{assist}$ is determined so as to limit the flow of fuel in order to avoid any surge phenomenon. Assistance period $t_{assist}$ can correspond to the time spent by turbomachine 100 at the operability limit protecting against the surge phenomenon.

The mechanical assistance torque generated by means of the electric machine $\Gamma_{HP}$ is determined so as to comply with a predetermined acceleration path for speed N2r of HP shaft 122.

Method 200 then comprises a step 204 of determining an energy deficit $E_d$ for LP shaft 121. Energy deficit $E_d$ represents the loss in energy between the power of the generated gases $P_{core}$ exiting HP turbine 114 in the presence of electrical assistance and the power of the reference gases $P_{core}$ exiting HP turbine 114, as shown in FIG. 2.

Step 204 may be implemented by the control block diagram 204c of FIG. 4.

Step 204 comprises the receiving of speed N2r from HP shaft 122 and of the supplied mechanical assistance torque generated by means of the electric machine $\Gamma_{HP}$.

A previously established database 22 comprises power values for the hot gases as a function of the speed N2r of HP shaft 122 and of the supplied mechanical assistance torque generated by means of the electric machine $\Gamma_{HP}$. Database 22 may be established experimentally or by digital simulation.

Using database 22, an effective power for the hot gases $P_{core_{eff}}$ and a reference power for the hot gases $P_{core_{nom}}$ are obtained.

The reference power for the hot gases $P_{core_{nom}}$ is obtained as a function of the speed N2r of HP shaft 122 when the supplied mechanical assistance torque generated by means of the electric machine $\Gamma_{HP}$ is zero.

The effective power for the hot gases $P_{core_{eff}}$ is obtained as a function of the speed N2r of HP shaft 122 and of the supplied mechanical assistance torque generated by means of the electric machine $\Gamma_{HP}$.

Step 204 comprises the calculation of the difference $P_{def}$ between the effective power of the hot gases $P_{core_{eff}}$ and the reference power of the hot gases $P_{core_{nom}}$.

Step 204 then comprises the calculation of the energy deficit $E_d$, by block 24, as a function of the power differences $P_{def}$ obtained during assistance period $t_{assist}$. Block 24 consists of integrating the power differences $P_{def}$ over assistance period $t_{assist}$.

The method then comprises a step 206 of determining a mechanical torque to be collected by means of the electric machine $\Gamma_{HP3}$ at HP shaft 122, to allow compensating for the delay in speed N1r in the presence of electrical assistance, in comparison to reference speed N1r. Step 206 first comprises determining a mean supplemental power $$P_{core_{sup_{mean}}}$$

to be supplied in order to reach reference speed N1r at a predetermined instant $t_{tar}$ as a function of the energy deficit $E_d$.

The determination of a mean supplemental power $$P_{core_{sup_{mean}}}$$

is carried out at the end of step 204.

The mean supplemental power is calculated by the following formula:

$$P_{core_{sup_{mean}}} = \frac{E_d}{t_{tar} - t_{assist}} \quad \text{[math 2]}$$

A power $P_{core_{sup}}$ corresponding to an instantaneous power to be provided between $t_{assist}$ and $t_{tar}$ is then determined, so as to ultimately produce the mean supplemental power $$P_{core_{sup_{mean}}}$$

at LP shaft 121 at $t_{tar}$. Power $P_{core_{mean}}$ may simply be incremented in steps, or in a more complex manner, for example ramped, a polynomial, etc.

The mechanical torque to be collected by means of the electric machine $\Gamma_{HP3}$ is determined as a function of the power $P_{core_{sup}}$, according to a preestablished law such as the one represented by curve C1 in FIG. 2b.

In step 208, a calculated mechanical torque to be collected by means of the electric machine $\Gamma_{HP3}$ is collected from HP shaft 122 at the end of assistance period $t_{assist}$. This mechanical torque is a braking torque from high-pressure shaft 122. Turbomachine 100 is then regulated to adjust the fuel flow supplied to turbomachine 100 in order to comply with the speed regime of HP shaft 122, in particular to follow the acceleration path dN2/dt of HP shaft 122.

Step 208 thus makes it possible to modify speed N1r of LP shaft 121 and therefore to follow curve C of the corrected speed N1r. Curve C of speed N1r approaches curve A of reference speed N1r after the end of the assistance period.

Method 200 therefore makes it possible to catch up to reference speed N1r of curve A more quickly in comparison to the speed N1r due to the electrical assistance of curve B without the correction of method 200.

Speed N1r or N2r can be determined by the rotation speed or by the acceleration of the corresponding LP shaft 121 or HP shaft 122.

Figure 6:
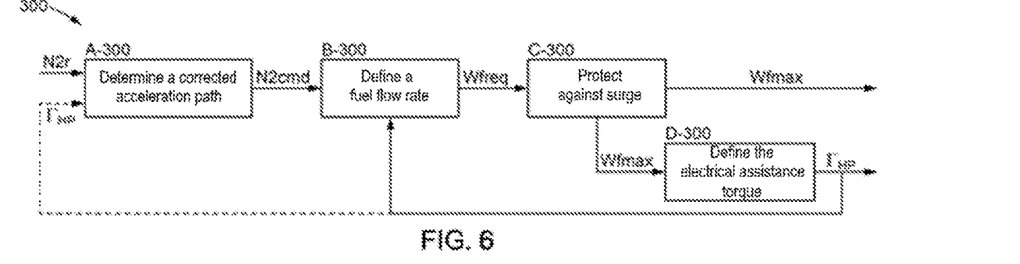
FIG. 6 represents a block diagram of a second example of a method for regulating the turbomachine of FIG. 1.
Figure 7:
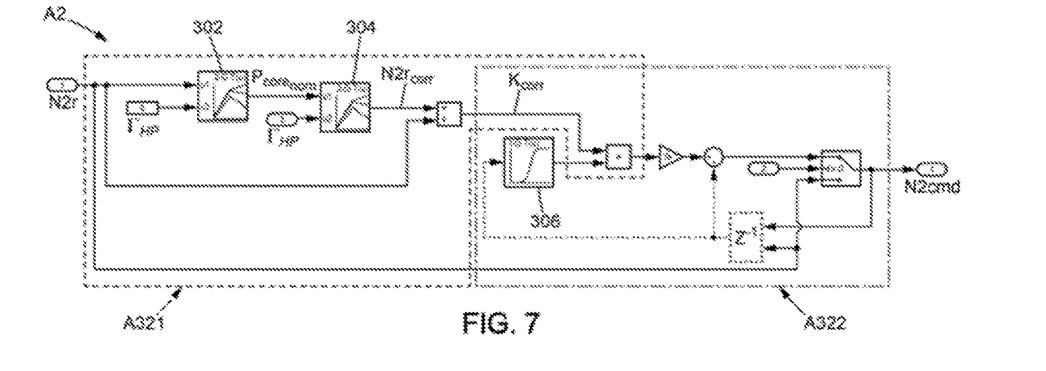
FIG. 7 represents a block diagram detailing step A2 of the second example of the method of FIG. 6.
Figure 8:
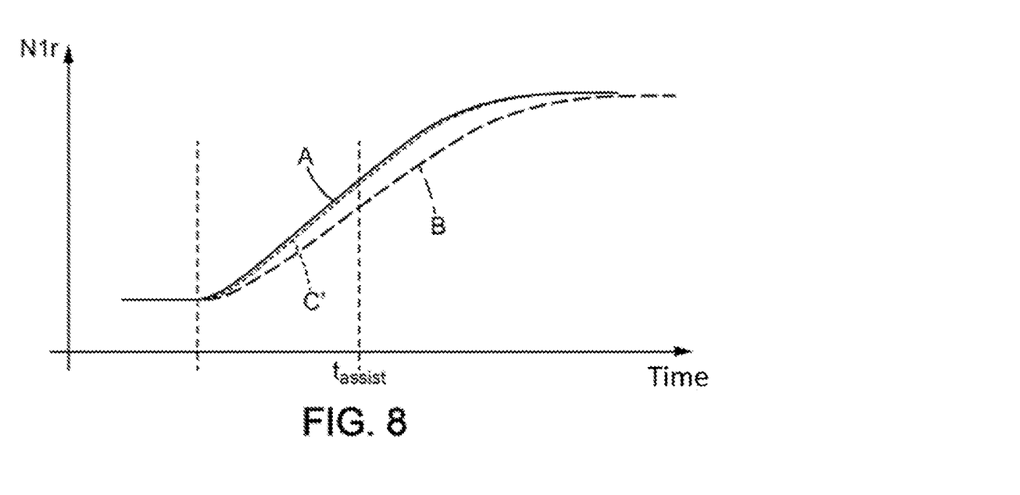
FIG. 8 represents the comparative curves of FIG. 2 in addition to a curve of the speed of the low-pressure shaft which is corrected using the method of FIG. 6.

With reference to FIGS. 6 to 8, a second example of a method 300 for regulating turbomachine 100 is configured to compensate for the reduction in speed N1r in the presence of electrical assistance.

Method 300 comprises a step C-300 of protecting turbomachine 100 against the surge phenomenon. Step C-300 determines whether a fuel flow setpoint Wfreq poses a risk of resulting in the surge phenomenon. Fuel flow setpoint Wfreq is determined so that a setpoint N2cmd for the speed of HP shaft is reached.

If no risk of surge is detected in step C-300, fuel flow setpoint Wfreq is sent to a thermal module in order to reach said fuel flow setpoint Wfreq.

Conversely, if a risk of surge is detected in step C-300, an electrical assistance step D-300 is carried out in order to comply with a maximum admissible fuel flow setpoint Wmax.

Step D determines the mechanical assistance torque generated by means of the electric machine $\Gamma_{HP}$, to be supplied to HP shaft 122 in order to ensure speed setpoint N2cmd for HP shaft 122, when the fuel flow setpoint is limited, by the surge protection operability limit, to the maximum admissible fuel flow setpoint Wmax. In other words, the mechanical assistance torque generated by means of the electric machine $\Gamma_{HP}$ is configured to compensate for saturation of the fuel flow setpoint.

Method 300 further comprises a step B-300 in which:
- the mechanical assistance torque generated by means of the electric machine $\Gamma_{HP}$, determined during step D-300, is received, and
- the fuel flow Wfreq is determined as a function of the mechanical assistance torque generated by means of the electric machine $\Gamma_{HP}$, and of speed setpoint N2cmd for HP shaft 122.

The supplied mechanical assistance torque generated by means of the electric machine $\Gamma_{HP}$ makes it possible to reach speed setpoint N2cmd for HP shaft 122 without inducing surge but results in a power deficit in the hot gases exiting the high-pressure turbine and therefore a delay in the acceleration of LP shaft 121.

To compensate for this loss of speed of LP shaft 121, method 300 comprises a step A-300 for correcting the path of setpoint N2cmd as a function of the mechanical assistance torque generated by means of the electric machine $\Gamma_{HP}$ and of current speed N2r of HP shaft 122. Step A2 comprises a sub-step A321 of determining a correction coefficient $K_{corr}$ as a function of the current speed N2r of HP shaft 122 and of a corrected speed $N2r_{corr}$ of HP shaft 122. In particular, correction coefficient $K_{corr}$ is the ratio between current speed N2r of HP shaft 122 and corrected speed $N2r_{corr}$ of HP shaft 122, calculated for example by the following formula:

$$K_{corr} = \frac{N2r_{corr}}{N2r} \quad [\text{math 3}]$$

Corrected speed $N2r_{corr}$ of HP shaft 122 is determined as a function of current speed N2r of HP shaft 122 and by consulting the previously defined databases 302 and 304.

Database 302 comprises the power values for the hot gases $P_{core}$ as a function of speed N2r of HP shaft 122 and of the mechanical assistance torque generated by means of the electric machine $\Gamma_{HP}$. Database 304 comprises the values for speed N2r of HP shaft 122 as a function of the power of the hot gases $P_{core}$ and of the mechanical assistance torque generated by means of the electric machine $\Gamma_{HP}$. Database 304 comprises the inverse function of database 302.

Databases 302 and 304 may be determined experimentally or by numerical simulation as a function of the characteristics of turbomachine 100.

Database 302 is first consulted to determine the reference power for the hot gases $P_{core_{nom}}$ for current speed N2r of HP shaft 122 for a zero mechanical assistance torque generated by means of the electric machine $\Gamma_{HP}$. Database 304 is then consulted to determine corrected speed $N2r_{corr}$ for producing the reference power for the hot gases $P_{core_{nom}}$. Corrected speed $N2r_{corr}$ is obtained as a function of the reference power for the hot gases $P_{core_{nom}}$ and of the mechanical assistance torque generated by an electric machine $\Gamma_{HP}$ supplied at the end of step D-300.

Step A-300 comprises a sub-step A322 of determining the speed setpoint N2cmd for HP shaft 122 by correcting acceleration path 306 of speed N2r by correction coefficient $K_{corr}$, for example by multiplying acceleration path 306 of speed N2r and correction coefficient $K_{corr}$. Step A2 thus makes it possible to modify the acceleration path of HP shaft 122, thus causing speed N1r of LP shaft 121 to follow curve C' of corrected speed N1r. Curve C' of speed N1r approaches curve A of reference speed N1r from the very start of assistance phase $t_{assist}$.

The invention claimed is:

1. Method for regulating a turbomachine, the turbomachine comprising an electric machine, a combustion chamber, a high-pressure turbine connected to a high-pressure shaft and a low-pressure turbine connected to a low-pressure shaft, wherein hot gases exiting the high-pressure turbine drive the low-pressure turbine, the method comprising:

assisting the high-pressure shaft by means of the electric machine, in order to provide said high-pressure shaft with mechanical energy coming from electrical energy supplied to the electric machine, to supplement thermal energy coming from the combustion chamber of the turbomachine, during an assistance period;

determining, during the assistance period, an energy deficit at an outlet of the high-pressure turbine, as a function of a difference between the power of the hot gases and a reference power of the hot gases in absence of electrical assistance;

calculating a collectable mechanical torque at the high-pressure shaft to be collected by means of the electric machine, as a function of said energy deficit; and correcting a speed of the low-pressure shaft by collecting said collectable mechanical torque from the high-pressure shaft, by means of the electric machine, at the end of the assistance period in order to reach a reference speed of the low-pressure shaft that was previously determined in absence of electrical assistance by the electric machine.

2. The method according to claim 1, comprising:

determining, during the assistance period, an energy deficit at an outlet of the high-pressure turbine, as a function of a difference between the power of the hot gases and a reference power of the hot gases in absence of electrical assistance;

calculating a collectable mechanical torque at the high-pressure shaft to be collected by means of the electric machine, as a function of said energy deficit; and collecting said collectable mechanical torque from the high-pressure shaft, by means of the electric machine, at the end of the assistance period.

3. The method according to claim 2, wherein determining the energy deficit comprises:

for each instant of the assistance period, calculating a difference between the power of the hot gases and the reference power of the hot gases in the absence of electrical assistance; and calculating the energy deficit by integrating the calculated differences over the assistance period.

4. The method according to claim 2, wherein calculating the collectable mechanical torque comprises:

providing a target instant for reaching the reference speed of the low-pressure shaft;

calculating a mean power as a function of the energy deficit and the target instant; and calculating the collectable mechanical torque to be collected by means of the electric machine as a function of the mean power, in order to supply said mean power to the low-pressure shaft.

5. The method according to claim 2, wherein the turbomachine comprises an electric motor configured to supply a mechanical assistance torque by means of the electric machine to the high-pressure shaft, wherein the power of the hot gases is determined as a function of the speed of the high-pressure shaft and of the mechanical assistance torque generated by means of the electric machine, and wherein the reference power of the hot gases is previously determined as a function of the speed of the high-pressure shaft when the mechanical assistance torque generated by means of the electric machine is zero.

6. Turbomachine comprising an electric machine, a combustion chamber, a high-pressure turbine connected to a high-pressure shaft and a low-pressure turbine connected to a low-pressure shaft, the turbomachine further comprising a device configured for correcting the speed of the low-pressure shaft in accordance with the method of claim 1.

7. Method for regulating a turbomachine, the turbomachine comprising an electric machine, a combustion chamber, a high-pressure turbine connected to a high-pressure shaft and a low-pressure turbine connected to a low-pressure shaft, wherein hot gases exiting the high-pressure turbine drive the low-pressure turbine, the method comprising:

assisting the high-pressure shaft by means of the electric machine, in order to provide said high-pressure shaft with mechanical assistance torque coming from electrical energy supplied to the electric machine, to supplement thermal energy coming from the combustion chamber of the turbomachine, during an assistance period;

determining a correction coefficient as a function of the mechanical assistance torque generated by means of the electric machine; and correcting a speed of the low-pressure shaft by regulating the speed of the high-pressure shaft as a function of the correction coefficient in order to reach a reference speed of the low-pressure shaft that was previously determined in absence of electrical assistance by the electric machine.

8. The method according to claim 7, wherein the turbomachine comprises an electric motor configured to provide a mechanical assistance torque by means of the electric machine to the high-pressure shaft during the assistance period, and the method comprises:

determining a correction coefficient as a function of the mechanical assistance torque generated by means of the electric machine; and regulating the speed of the high-pressure shaft as a function of the correction coefficient.

9. The method according to claim 8, wherein the correction coefficient is determined as a function of:

the speed of the high-pressure shaft at an operating instant of the turbomachine; and a corrected speed of the high-pressure shaft.

10. The method according to claim 9, wherein the correction coefficient is a ratio between the speed of the high-pressure shaft at the operating instant of the turbomachine and the corrected speed of the high-pressure shaft.

11. The method according to claim 9, wherein the corrected speed of the high-pressure shaft is determined by, for an operating instant of the turbomachine:

measuring the speed of the high-pressure shaft at said operating instant;

determining the reference power of the hot gases which corresponds to the speed of the high-pressure shaft for said operating instant in the absence of electrical assistance; and determining the corrected speed of the high-pressure shaft as a function of the reference power of the hot gases and of the mechanical assistance torque generated by means of the electric machine at said operating instant.

12. The method according to claim 11, wherein measuring the speed of the high-pressure shaft at said operating instant is performed during the electrical assistance period.

13. The method according to claim 8, wherein regulating the speed of the high-pressure shaft comprises:

providing an acceleration path for the high-pressure shaft;

applying the correction coefficient to the acceleration path of the high-pressure shaft; and controlling the speed of the high-pressure shaft to follow the path of the corrected acceleration path of the high-pressure shaft.

* * * * *